US010387519B2

(12) United States Patent
Bentley et al.

(10) Patent No.: US 10,387,519 B2
(45) Date of Patent: Aug. 20, 2019

(54) METHOD AND SYSTEM FOR AUTOMATIC GENERATION OF PERSONALIZED APPLICATIONS

(71) Applicant: OATH INC., New York, NY (US)

(72) Inventors: Frank Bentley, San Francisco, CA (US); Kent Lyons, Santa Clara, CA (US); Christian Holz, San Francisco, CA (US)

(73) Assignee: OATH INC., New York, NY (US)

( * ) Notice: Subject to any disclaimer, the term of this patent is extended or adjusted under 35 U.S.C. 154(b) by 312 days.

(21) Appl. No.: 14/319,789

(22) Filed: Jun. 30, 2014

(65) Prior Publication Data

US 2015/0379152 A1 Dec. 31, 2015

(51) Int. Cl.
*G06F 3/048* (2013.01)
*G06F 16/955* (2019.01)
*H04L 29/08* (2006.01)
*G06F 8/658* (2018.01)
*G06F 9/445* (2018.01)

(52) U.S. Cl.
CPC ............ *G06F 16/955* (2019.01); *G06F 8/658* (2018.02); *H04L 67/34* (2013.01); *G06F 9/4451* (2013.01)

(58) Field of Classification Search
CPC ........... G06F 17/30876; G06F 3/04817; G06F 3/0482; G06F 3/04842; G06F 8/30; H04L 67/34
See application file for complete search history.

(56) References Cited

U.S. PATENT DOCUMENTS

| 2005/0268239 | A1* | 12/2005 | Seshadri | G06F 3/0482 715/747 |
| 2010/0011304 | A1* | 1/2010 | van Os | G06F 3/04817 715/762 |
| 2011/0202853 | A1* | 8/2011 | Mujkic | H04L 12/5815 715/753 |
| 2012/0260202 | A1* | 10/2012 | Jiang | G06F 9/445 715/765 |
| 2012/0287154 | A1* | 11/2012 | Yook | G06F 3/04886 345/629 |
| 2013/0139182 | A1* | 5/2013 | Sethuraman | G06Q 50/01 719/320 |

(Continued)

OTHER PUBLICATIONS

"iPhone URL Schemes," Akosma wiki, May 23, 2013, available at https://web.archive.org/web/20130523073858/http://wiki.akosma.com/IPhone_URL_Schemes.*

(Continued)

*Primary Examiner* — Andrew T Chiusano
(74) *Attorney, Agent, or Firm* — James J. DeCarlo; Greenberg Traurig, LLP

(57) ABSTRACT

Disclosed is a system, method, and non-transitory computer readable storage medium for creating personalized instantiations of an app. User input is accepted to create, by a computing device, a personalized instantiation of an app, the app comprising a home screen, the creating of the personalized instantiation occurring by generating a deep linked shortcut on the home screen of the app that links into the app with parameters to configure the app into the personalized instantiation of the app. A display is generated for displaying, on the computing device, the personalized instantiation of the app so that the personalized instantiation of the app can be launched as configured with the parameters.

27 Claims, 6 Drawing Sheets

(56) References Cited

U.S. PATENT DOCUMENTS

| | | | | |
|---|---|---|---|---|
| 2013/0304729 A1* | 11/2013 | Jiang | ............... | G06F 17/30905 707/723 |
| 2013/0318077 A1* | 11/2013 | Greenzeiger | ..... | G06F 17/30241 707/724 |
| 2014/0188606 A1* | 7/2014 | Moore | ............... | G06Q 30/0251 705/14.53 |
| 2014/0282032 A1* | 9/2014 | Brown | ............... | G06F 3/0484 715/738 |
| 2014/0337831 A1* | 11/2014 | Katagai | ............... | G06F 8/61 717/178 |
| 2015/0074546 A1* | 3/2015 | Slawson | ............... | G06F 3/0484 715/747 |
| 2015/0143216 A1* | 5/2015 | Huang | ............... | H04L 51/04 715/208 |
| 2015/0201062 A1* | 7/2015 | Shih | ............... | H04M 1/72552 455/564 |
| 2015/0242507 A1* | 8/2015 | Shapira | ............... | G06Q 30/0282 707/722 |

OTHER PUBLICATIONS

Avocado—Messaging, calendar and more for couples; <<https://avocado.io/>> Retrieved Jun. 5, 2014.
Cupple—Private Sharing Made Easy; <<http://cupple.mobi/>> Retrieved Jun. 5, 2014.
Couple; <<https://couple.me/>> Retrieved Jun. 30, 2014.
Tokii.com; <<http://www.tokii.com/>> Retrieved Jun. 5, 2014.
Between—Best App for Couples; <<http://between.us/en/>> Retrieved Jun. 5, 2014.

* cited by examiner

METHOD AND SYSTEM FOR AUTOMATIC GENERATION OF PERSONALIZED APPLICATIONS

FIELD

The present disclosure relates to applications ("apps"), and more specifically to a method and system for the automatic generation of personalized apps.

BACKGROUND

Apps written for mobile devices include, for example, messaging apps, weather apps, email apps, social media apps, photo apps, etc. Messaging apps, for example, enable users to communicate with one another, typically via text messages. Some messaging apps are for two specific people, such as for a couple. Examples of messaging apps that are for two specific people include, without limitation, Pai™, Avocado™, Cupple™, Tokii™, and Between™.

Although these messaging apps may be useful for communications between two specific people, people in general communicate with more than two people. These example apps do not create multiple pairs of users for communications.

SUMMARY

In one aspect, a system, method, and non-transitory computer readable storage medium is disclosed for creating personalized instantiations of an app. User input is accepted to create, by a computing device, a personalized instantiation of an app, the app comprising a home screen, the creating of the personalized instantiation occurring by generating a deep linked shortcut on the home screen of the app that links into the app with parameters to configure the app into the personalized instantiation of the app. A display is generated for displaying, on the computing device, the personalized instantiation of the app so that the personalized instantiation of the app can be launched as configured with the parameters.

In one embodiment, the computing device selects a contact to communicate with via the personalized instantiation of the app. The personalized instantiation includes a plurality of personalized instantiations, each personalized instantiation in the plurality for communication with one or more of a plurality of contacts. In one embodiment, the computing device receives a request to launch the app on the computing device.

The parameters to configure the app can include parameters such as background settings, color settings, time message is stored settings, time message is displayed settings, location sharing settings, communication settings, and/or display settings. The app may be, for example, a messaging app, an email app, a social networking app, a weather app, a photo app, or a currency converter app.

In one embodiment, the computing device generates a personalized icon for display, where the personalized icon is related to the personalized instantiation of the app. For example, the personalized icon may include a display of a photograph (e.g., of the person who the user will be communicating with via the personalized instantiation).

In one embodiment, the computing device displays an advertisement related to displayed contents of the personalized instantiation of the app.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
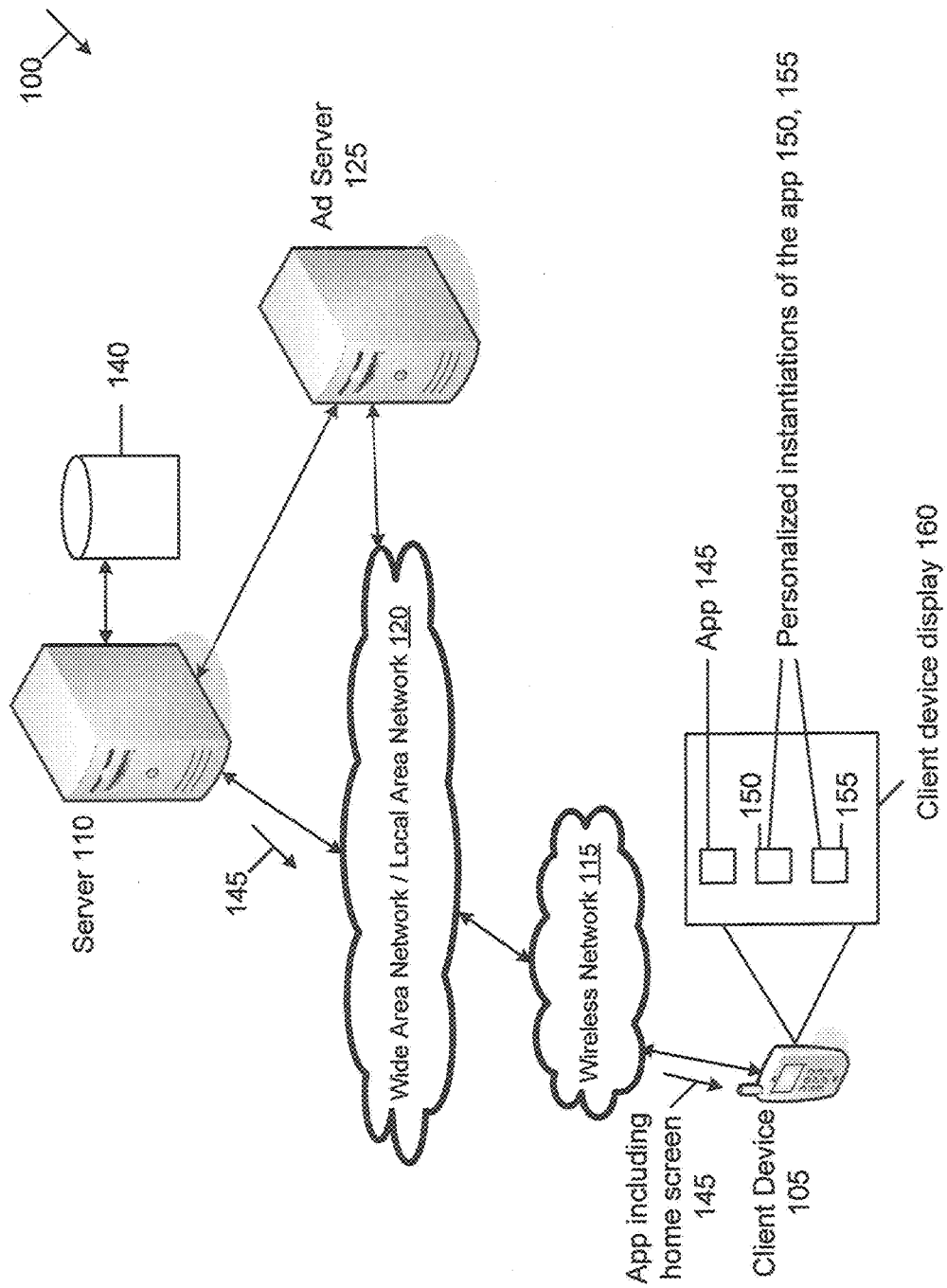
FIG. 1 is a schematic diagram illustrating an example system of a network and devices implementing embodiments of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a schematic diagram illustrating an example system 100 of a network and devices implementing embodiments of the present disclosure. Other embodiments that may vary, for example, in terms of arrangement or in terms of type of components, are also intended to be included within claimed subject matter. FIG. 1 includes, for example, a client device 105 (also referred to herein as client 105) in communication with a server 110 over a wireless network 115 connected to a local area network (LAN)/wide area network (WAN) 120, such as the Internet. Server 110 is also referred to below as server computer 110. In one embodiment, the client device 105 and/or the server 110 is also in communication with an advertisement server (ad server) 125 that can provide advertisements to the client device 105. Although shown as a wireless network 115 (and WAN/LAN 120), the client device 105 can communicate with server 110 via any type of network. The server 110 is in communication with a database 140.

In one embodiment, the server 110 provides an app 145 which includes a home screen. The app 145 can be downloaded by the client device 105 from the server 110 or from an app store, such as Apple®'s App Store® or Google® Play®. The app 145 may be, for example, a messaging app, an email app, a social networking app, a photo app (e.g., photo sharing app), a weather app, a currency converter app, etc. The client device 105 downloads the app 145 and the user of the client device 105 launches the app 145.

In one embodiment, the client device 105 accepts user input to create a personalized instantiation 150, 155 of the app 145 by generating a deep linked shortcut on the home screen of the app that links into the app with parameters to configure the app into the personalized instantiation of the app 150, 155. The app 145 generates a display for displaying the personalized instantiations 150, 155 on a display 160 of the client device 105 so that the personalized instantiations 150, 155 of the app can be launched as configured with the parameters.

For example, suppose a first user wants to communicate via a messaging app with her spouse. The first user downloads a messaging app and then creates a personalized messaging app for communication with her spouse. As described in more detail below, the first user can customize the personalized messaging app with parameters, such as customizing the color scheme, background, communication settings, display settings, amount of time a message is stored, amount of time a message is displayed, etc. In one embodiment, the first user can select a photograph of her spouse to display as the icon for this personalized instantiation (e.g., instantiation 150) of the message app. Further, suppose the first user wants to create another personalized messaging app for communication with her daughter. The first user creates a second personalized messaging app 155 with different parameters and can display a photograph of her daughter as the icon on the client device display 160. When the first user wants to communicate with her daughter, the first user selects that personalized instantiation 155 of the messaging app and this messaging app enable communications with the first user's daughter with the configured parameters. When the first user wants to communicate with her spouse, the first user selects that personalized instantiation 150 of the messaging app and this messaging app will enable communications with the first user's spouse with those (e.g., likely) configured parameters. Although two personalized instantiations 150, 155 are shown, any number of personalized instantiations of the app 145 can be created.

In one embodiment, once the personalized instantiation 150, 155 is created, the app 145 transmits a message to the other user (e.g., spouse or daughter) to notify them to download the app 145. In one embodiment, a further notification is presented to create a personalized instantiation of the app 145 for communication with the first user.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Examples of devices that may operate as a server include desktop computers, multiprocessor systems, microprocessor-type or programmable consumer electronics, etc. Server 110 may provide a variety of services that include, but are not limited to, web services, third-party services, audio services, video services, email services, instant messaging (IM) services, SMS services, MMS services, FTP services, voice over IP (VOIP) services, calendaring services, photo services, social media services, or the like. Examples of content may include text, images, audio, video, or the like, which may be processed in the form of physical signals, such as electrical signals, for example, or may be stored in memory, as physical states, for example. In one embodiment and as stated above, the server 110 hosts or is in communication with a database 140.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Moreover, although FIG. 1 illustrates server 110 as a single computing device, the disclosure is not so limited. For example, one or more functions of server 110 may be distributed across one or more distinct computing devices. Moreover, in one embodiment, multiple servers may be integrated into a single computing device, without departing from the scope of the present disclosure.

In one embodiment and as described herein, the client device 105 and/or server 110 is a smartphone. In another embodiment, the client device 105 and/or server 110 is a tablet. The client device 105 and/or server 110 may also be a wearable computing device, such as glasses (e.g., Google® Glass®) or a watch.

An ad server 125 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with the user. Such sponsored advertising includes monetization techniques including sponsored search advertising, non-sponsored search advertising, guaranteed and non-guaranteed delivery advertising, ad networks/exchanges, ad targeting, ad serving and ad analytics.

In one embodiment, the ad server 125 transmits ads for display while the user is using a personalized instantiation 150, 155 of the app 145. For example, an advertisement may be displayed based on the contents of a message, based on the context of a message, based on the location of the client device 105, based on the two users communicating with each other, based on the relationship between the two users, based on media being shared between the two users, etc. For example, an advertisement for restaurants may be displayed when the first user sends a message to her spouse that she is hungry for dinner. In another embodiment, a coupon is displayed. In another embodiment, an advertisement or coupon is displayed for a local restaurant based on the message and the location of the client device 105.

Figure 2:
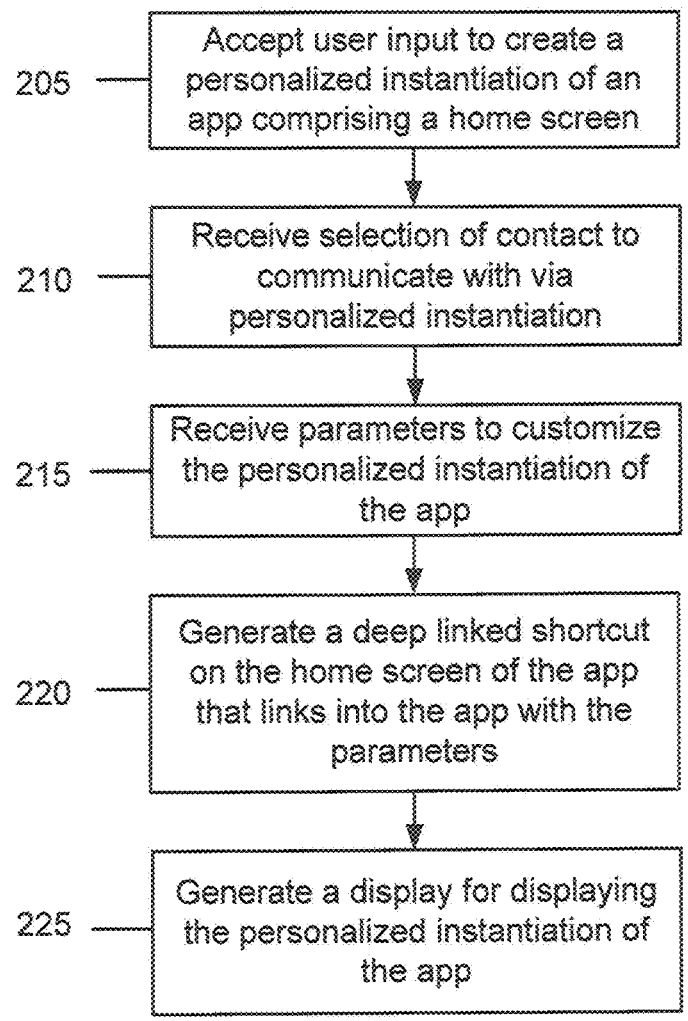
FIG. 2 is a flowchart illustrating steps performed by the server of FIG. 1 in accordance with an embodiment of the present disclosure.

FIG. 2 is a flow diagram of an embodiment of steps performed by the client device 105 to create and display a personalized instantiation 150, 155 of an app 145. The app 145 automatically creates customized or personalized applications on the client device 105. The user could create one instance to communicate with their best friend while another gets created for their sibling. Each instance looks to the end user as if it is installed for that specific pair of people.

The client device 105 accepts user input to create a personalized instantiation 150, 155 of an app 145 including a home screen (Step 205). The client device 105 downloads the app 145 if the client device 105 does not already have the app 145. In one embodiment, the app 145 receives a selection of a contact from the first user's contacts to whom the first user wants to communicate with via the personalized instantiation 150 (Step 210). The app 145 then receives parameters to customize the personalized instantiation 150 of the app 145 (Step 215). As described above, the first user can customize the personalized messaging app 150 with parameters, such as customizing the color scheme of the personalized instantiation 150, background of the screen displayed when executing the personalized instantiation 150, communication settings (share all content and data, share music being listened to, etc.), display settings (e.g., font used, color of text, etc), amount of time a message is stored (e.g., message is erased a few seconds after being received, message is stored indefinitely, etc.), amount of time a message is displayed (e.g., message disappears a few seconds after being displayed, message is displayed indefinitely), geofencing, application icon, etc.

The app 145 then generates a deep linked (web) shortcut on the home screen of the app 145 that links into the app with the parameters to configure the app to look like it is only for the given person (or entity or location or group of photos, as described further herein) that the user wants to communicate with (Step 220). In one embodiment, the link takes the format:

yahoo://pairapp/[name]/[phonenumber]/[contactid]
(e.g., yahoo://pairapp/Frank%20Bentley/18475555555/1234)

which enables an app 150 to be opened with the contact photo, name, and phone number to communicate with for the specific person desired. The home screen shortcut can be created directly in the application (on Android®) or via an embedded mobile web page that created a custom link (on iOS®) so that to the end users it appears that a totally new application or "app" is generated and available on the device screen that displays app icons. In an embodiment where the app is a communication app, the app 150 is configured for two people to connect with that instance 150 of the app 145. The app 145 then generates a display for displaying the personalized instantiation 150, 155 of the app 145 on the display 160 of the client device 105 (Step 225).

The auto generation of personalized apps can be accomplished through other means as well. For example, a shell application or webpage could cause the creation of a separate actual native application on the server 110 for the contact (or other entity, location or data item as appropriate to the specific implementation), which is then downloaded and installed. Thus, only one app 145 needs to be in the app store and officially approved.

Although an example is described herein as a messaging app, the personalized instantiations 150, 155 of the app 145 can alternatively be other apps as well. For example, suppose the app 145 is a weather app. The personalized instantiations 150, 155 of the weather app 145 can be a weather app for a specific location. This personalized instantiation can provide the user with the weather at the specific location as well as other information relating to the specific location. The weather app personalized instantiation may be displayed with a photograph of a landmark at the specific location (e.g., Golden Gate Bridge for a San Francisco weather app instantiation, with a second icon for the Statue of Liberty for a New York instantiation also appearing). For example, the Yahoo! Weather app can have personalized instantiations with different information and different user interfaces, such as app page icons, and photos for a specific instantiation relating to a particular location. In another embodiment, a blog site such as Tumblr® can enable personalized instantiations to customize the appearance of a blog, or to have icons representing different blogs being followed. Of course, the instantiation can, when activated, contain specific advertising keyed to the data used to personalize the instantiation, based on location, user preferences, and/or context, as non-limiting examples.

In another embodiment, the app 145 can be an email messaging app in which the personalized instantiations 150, 155 of the app 145 are email messaging apps for emailing between two people. In another embodiment, the app 145 can be a photo (or video) organizing app. The personalized instantiations 150, 155 can be photos for videos) for a specific event or location, such as photos (or videos) for a birthday party or photos (or videos) associated with a particular vacation or trip. The user can create multiple instantiations, one for a birthday party, one for a trip, one for a graduation, etc. The personalized instantiation 150, 155 for the birthday party could group all photos (or videos) associated with a specific birthday party into the app. The parameters that the user sets could include, for example, the specific date of the birthday party, how the photos (or videos) should be displayed (slideshow, one at a time, thumbnails, list of photos (or videos), etc.), etc.

Figure 3:
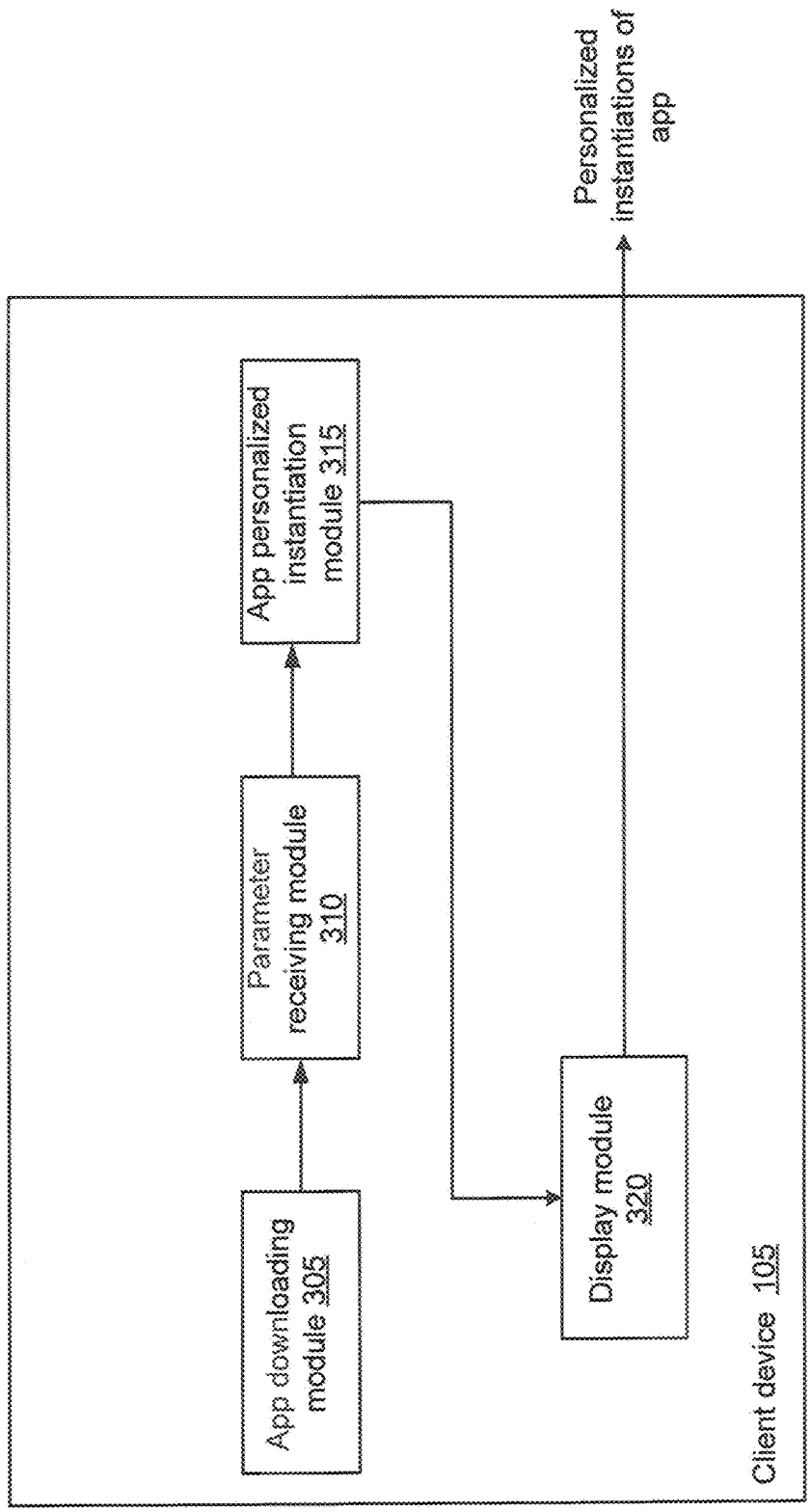
FIG. 3 is a block diagram illustrating modules of the server of FIG. 1 in accordance with an embodiment of the present disclosure.

FIG. 3 is a block diagram of an embodiment of the modules of the client device 105. The client device 105 includes an app downloading module 305 to download the app 145 from the server 110. The client device 105 also includes, in one embodiment, a parameter receiving module 310. The parameter receiving module 310 can receive a selection of a contact to communicate with from the user's contacts and/or can receive parameters for configuring the personalized instantiation 150, 155 of the app 145. The client device 105 also includes, in one embodiment, an app personalized instantiation module 315 to create a personalized instantiation of an app from the parameters via a deep link into the app. The client device 105 also includes a display module 320 for displaying the personalized instantiation of the app.

In another embodiment, the parameters are preconfigured so that a personalized instantiation is created with a set of specific parameters. In this embodiment, for example, different contacts could automatically have different preconfigured parameters (e.g., communications with daughter are set to never disappear while communications with friends are set to disappear after 10 seconds).

Further, in one embodiment, during communications between a pair of individuals, the personalized instantiation of the app 150, 155 could determine, from contextual information associated with the communications, suggested changes to one or more parameters for the personalized instantiation. A balloon or message may appear during communications suggesting a change to the personalized instantiation of the app.

In one embodiment, e-commerce vendors may provide the ability to create personalized instantiations of their app to users. For example, a company that sells menswear, women's clothing, and shoes could enable a user to create a personalized instantiation of a menswear app that takes the user to the menswear section of the company's web site when the user launches that personalized instantiation of the app. This provides further advertising/monetization options, as ads can be fed to personalized instantiations of apps with a higher degree of relevancy.

Figure 4:
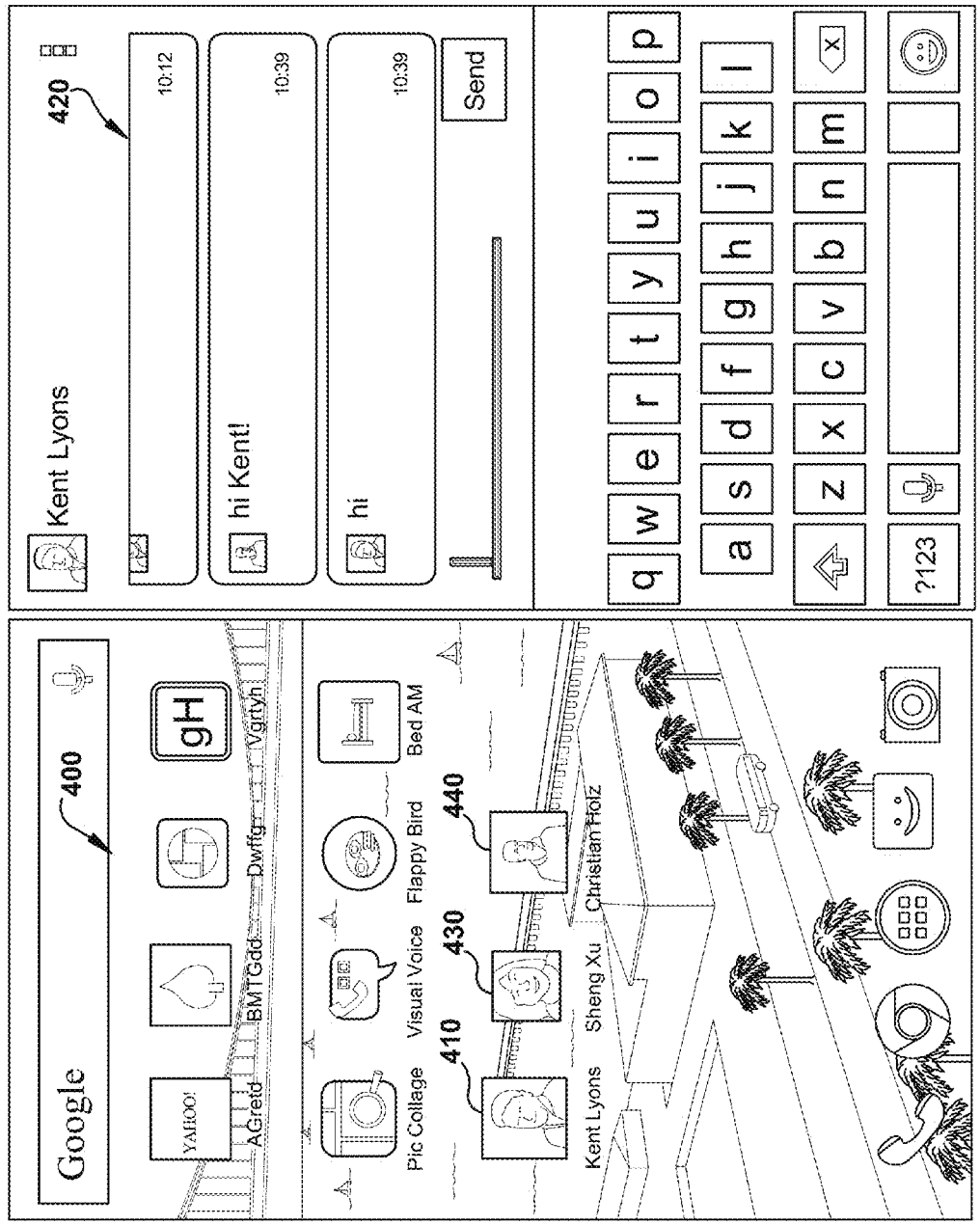
FIG. 4 is a screen shot illustrating a user interface having personalized instantiations of an app in accordance with an embodiment of the present disclosure.

FIG. 4 is an exemplary screen shot of a user interface 400 including several personalized instantiations of a messaging app. For example, a personalized instantiation of the messaging app to communicate with "Kent Lyons" is shown as instantiation 410. When selected, the personalized instantiation 410 displays a messaging screen 420 in which the user can communicate with Kent Lyons. In one embodiment, the personalized instantiation 410 of the messaging app for Kent Lyons is shown with an icon having Kent's photograph. Other personalized instantiations, such as instantiation 430 for "Sheng Xu" and instantiation 440 for "Christian Holz", are also shown. Although three personalized instantiations 410, 430, 440 are shown, any number of personalized instantiations can be created.

In other embodiments, in addition to or as an alternative to the deep linking techniques described herein to facilitate a personalized instantiation, alternate IPC (inter process communication) mechanisms can be used, such as sockets (e.g., BSD sockets, or a computing library with an application programming interface (API) for sockets). Alternatively, intents (e.g., Android® intents) are used. In one embodiment, intents allow two web applications to communicate with each other, without either of them having to actually know what the other one is. An intent is an abstract description of an operation to be performed.

In another embodiment, apps can be compiled that have the personalization built in, so that, for example, personalized apps can be spawned by action taken by the user in the app, observed behavior between users via the device or via other applications, such as social network interactions. In another embodiment, the personalized instantiations can be configured as shell apps that don't stand alone but send state information or data to a main app.

Figure 5:
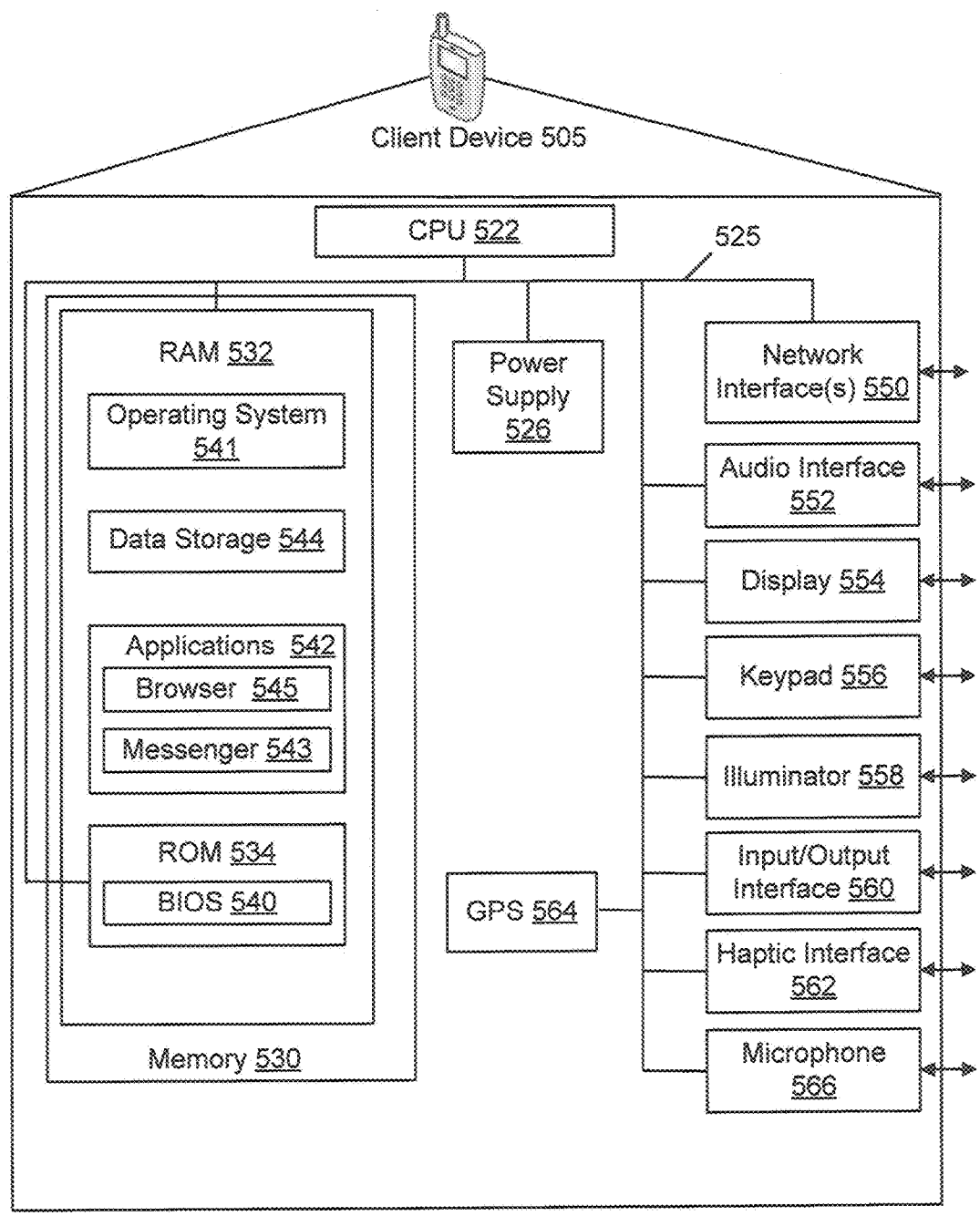
FIG. 5 shows an example of a schematic diagram illustrating a client device in accordance with an embodiment of the present disclosure.

FIG. 5 shows one example of a schematic diagram illustrating a client device 505 (e.g., client device 105). Client device 505 may include a computing device capable of sending or receiving signals, such as via a wired or wireless network. A client device 505 may, for example, include a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The client device 505 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, muss storage, one or more accelerometers, one or more gyroscopes, global positioning system (GPS) or other location-identifying type capability, of a display with a high degree of functionality, such as a touch-sensitive color 2D or 3D display, for example.

A client device 505 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as asocial network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 5, client device 505 may include one or more processing units (also referred to herein as CPUs) 522, which interface with at least one computer bus 525. A memory 530 can be persistent storage and interfaces with the computer bus 525. The memory 530 includes RAM 532 and ROM 534. ROM 534 includes a BIOS 540. Memory 530 interfaces with computer bus 525 on as to provide information stored in memory 530 to CRU 522 during execution of software programs such as an operating system 541, application programs 542, device drivers, and software modules 543, 545 that comprise program code, and/or computer-executable process steps, incorporating functionality described herein, e.g., one or more of process flows described herein. CPU 522 first loads computer-executable process steps from storage, e.g., memory 532, data storage medium media 544, removable media drive, and/or other storage device, CPU 522 can then execute the stored process steps in order to execute the loaded computer-executable process steps. Stored data, e.g., data stored by a storage device, can be accessed b CPU 522 during the execution of computer-executable process steps.

Persistent storage medium/media 544 is a computer readable storage medium(s) that can be used to store software and data, e.g., an operating system and one or more application programs. Persistent storage medium/media 544 can also be used to store device drivers, such as one or more of a digital camera driver, monitor driver, printer driver, scanner driver, or other device drivers, web pages, content files, playlists and other files. Persistent storage medium/media 506 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 505 can also include one or more of a power supply 526, network interface 550, audio interface 552, a display 554 (e.g., a monitor or screen), keypad 556, illuminator 558, I/O interface 560, a haptic interface 562, a GPS 564, and/or a microphone 566.

For the purposes of this disclosure a module is a software, hardware, or firmware or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 6:
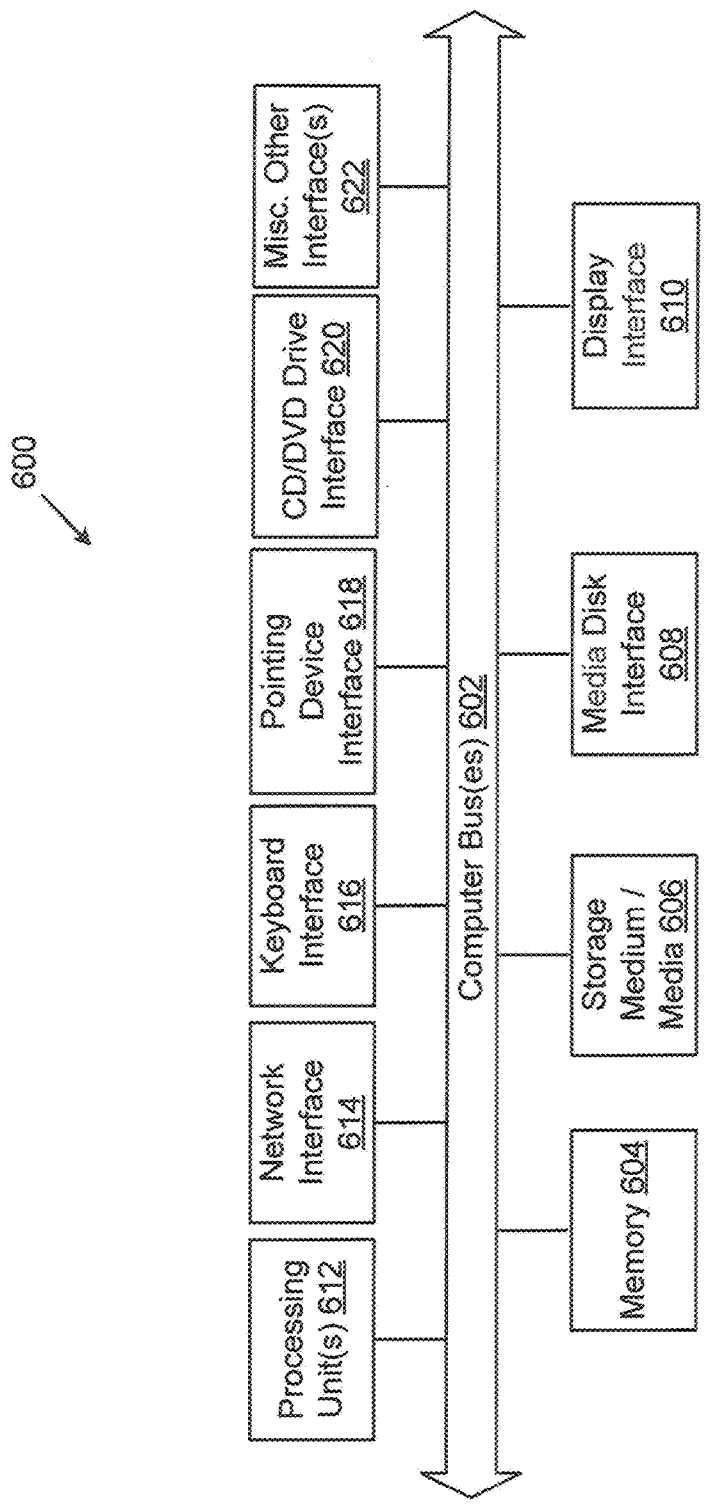
FIG. 6 is a block diagram illustrating an internal architecture of a computer in accordance with an embodiment of the present disclosure.

FIG. 6 is a block diagram illustrating an internal architecture of an example of a computer, such as server computer 110, 125 and/or client device 105 in accordance with one or more embodiments of the present disclosure. A computer as referred to herein refers to any device with a processor capable of executing logic or coded instructions, and could be a server, personal computer, set top box, tablet, smart phone, pad computer or media device, to name a few such devices. As shown in the example of FIG. 6, internal architecture 600 includes one or more processing units (also referred to herein as CPUs) 612, which interface with at least one computer bus 602. Also interfacing with computer bus 602 are persistent storage medium/media 606, network interface 614, memory 604, e.g., random access memory (RAM), run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, CD/DVD drive interface 620, and miscellaneous other interfaces 622, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

As described above, persistent storage medium/media 606 is a computer readable storage medium(s) that can be used to store software and data, e.g., an operating system and one or more application programs. Persistent storage medium/media 606 can also be used to store device drivers, such as one or more of a digital camera driver, monitor driver, printer driver, scanner driver, or other device drivers, web pages, content files, playlists and other files. Persistent storage medium/media 606 can further include program modules and data files used to implement one or more embodiments of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:

spawning, by a processor, a personalized instantiation of an app separately accessible from the app from which the personalized instantiation is spawned, the personalized instantiation customized based on parameters associated with contact details of a user and accessible via a user interface element specific to the personalized instantiation, the customization modifying an operation performed by the app based on the details of the user;

transmitting, by the processor, interaction data from the personalized instantiation of the app to the app, the interaction data comprising user input into the personalized instantiation of the app;

receiving, by the processor at the personalized instantiation of the app, an interaction response to the transmitted interaction data;

displaying, by the processor, the interaction response at the personalized instantiation of the app;

transmitting, by the processor, a message to the user in response to spawning the personalized instantiation of the app, the message including a notification to download the app;

generating, by the processor, a display for displaying the personalized instantiation of the app so that the personalized instantiation of the app can be launched as configured with the parameters via the user interface element; and transmitting, by the processor, a message to the user, the message comprising a notification identifying the personalized instantiation of the app and enabling creation of a second personalized instantiation of the app on the user's device.

2. The method of claim 1, further comprising receiving, by the processor, input from the user relating to the app.

3. The method of claim 1, wherein the spawning of the personalized instantiation further comprises utilizing an inter process communication selected from a group of inter process communication types consisting of sockets, a deep linked shortcut, and intents.

4. The method of claim 1, wherein the spawning further comprises compiling the personalized instantiation having the customization based on parameters built into the personalized instantiation.

5. The method of claim 1, wherein the spawning further comprises receiving an ad to be displayed in the personalized app, the ad having content related to the parameters.

6. A method comprising:
accepting user input to create, by a computing device, a personalized instantiation of an app, the app comprising a home screen, the creating of the personalized instantiation occurring by generating a deep linked shortcut on the home screen of the app that links into the app with parameters to configure a plurality of user interface elements of the app into the personalized instantiation of the app, wherein the deep linked shortcut comprises a scheme, an identifier representing the app, and the parameters;
generating a display for displaying, on the computing device, the personalized instantiation of the app so that the personalized instantiation of the app can be launched as configured with the parameters;
launching, by the computing device, the personalized instantiation of the app, the launching comprising modifying an operation performed by the app based on contact details of a user;
transmitting, by the computing device, interaction data from the personalized instantiation of the app to the app, the interaction data comprising user input into the personalized instantiation of the app;
receiving, by the computing device at the personalized instantiation of the app, an interaction response to the transmitted interaction data;
displaying, by the computing device, the interaction response at the personalized instantiation of the app; and
transmitting, by the computing device, a message to the user, the message comprising a notification identifying the personalized instantiation of the app and enabling creation of a second personalized instantiation of the app on the user's device.

7. The method of claim 6, further comprising selecting, by the computing device, a contact to communicate with via the personalized instantiation of the app.

8. The method of claim 6, wherein the personalized instantiation comprises a plurality of personalized instantiations, each personalized instantiation in the plurality for communication with one or more of a plurality of contacts.

9. The method of claim 6, further comprising receiving, by the computing device, a request to launch the app on the computing device.

10. The method of claim 6, wherein the parameters to configure the app further comprise parameters selected from a group of parameter types consisting of background settings, color settings, time message is stored settings, time message is displayed settings, location sharing settings, communication settings, and display settings.

11. The method of claim 6, wherein the app comprises an app chosen from a group of apps consisting of: a messaging app, an email app, a social networking app, a weather app, a photo app, or a currency converter app.

12. The method of claim 6, further comprising generating, by the computing device, a personalized icon for display, the personalized icon related to the personalized instantiation of the app.

13. The method of claim 12, wherein the personalized icon comprises a display of a photo.

14. The method of claim 6, further comprising displaying, by the computing device, an advertisement related to displayed contents of the personalized instantiation of the app.

15. A method comprising:
generating, by a processor, an app comprising a home screen, the app for
downloading to a computing device and for enabling creation of a personalized instantiation of the app by generating a deep linked shortcut on the home screen of the app that links into the app with parameters to configure a plurality of user interface elements of the app into the personalized instantiation of the app, wherein the deep linked shortcut comprises a scheme, an identifier representing the app, and the parameters;
providing, by the processor, the app for access by the computing device so that the personalized instantiation of the app can be launched as configured with the parameters;
launching, by the processor, the personalized instantiation of the app, the launching comprising modifying an operation performed by the app based on contact details of a user;
transmitting, by the processor, interaction data from the personalized instantiation of the app to the app, the interaction data comprising user input into the personalized instantiation of the app;
receiving, by the processor at the personalized instantiation of the app, an interaction response to the transmitted interaction data;
displaying, by the processor, the interaction response at the personalized instantiation of the app; and
transmitting, by the processor, a message to the user, the message comprising a notification identifying the personalized instantiation of the app and enabling creation of a second personalized instantiation of the app on the user's device.

16. The method of claim 15, further comprising enabling, by the processor, selection of a contact to communicate with via the personalized instantiation of the app.

17. The method of claim 15, wherein the parameters to configure the app further comprise parameters selected from a group of parameter types consisting of background settings, color settings, time message is stored settings, time message is displayed settings, location sharing settings, communication settings, and display settings.

18. The method of claim 15, wherein the app comprises an app chosen from a group of apps consisting of: a messaging app, an email app, a social networking app, a weather app, a photo app, or a currency converter app.

19. The method of claim 15, further comprising enabling, by the processor, generation of a personalized icon for display, the personalized icon related to the personalized instantiation of the app.

20. The method of claim 19, wherein the personalized icon comprises a display of a photo.

21. The method of claim 15, further comprising transmitting, by the processor to the computing device, an advertisement related to displayed contents of the personalized instantiation of the app.

22. A computing device comprising:

a processor;

a storage medium for tangibly storing thereon program logic for execution by the processor, the program logic comprising:

accepting logic executed by the processor for accepting user input to create, by the computing device, a personalized instantiation of an app, the app comprising a home screen, the creating of the personalized instantiation occurring by generating a deep linked shortcut on the home screen of the app that links into the app with parameters to configure a plurality of user interface elements of the app into the personalized instantiation of the app, wherein the deep linked shortcut comprises a scheme, an identifier representing the app, and the parameters;

generating logic executed by the processor for generating a display for displaying, on the computing device, the personalized instantiation of the app so that the personalized instantiation of the app can be launched as configured with the parameters;

launching logic executed by the processor for launching the personalized instantiation of the app, the launching comprising modifying an operation performed by the app based on the contact details of the user;

transmitting logic executed by the processor for transmitting interaction data from the personalized instantiation of the app to the app, the interaction data comprising user input into the personalized instantiation of the app;

receiving logic executed by the processor for receiving, at the personalized instantiation of the app, an interaction response to the transmitted interaction data;

displaying logic executed by the processor for displaying the interaction response at the personalized instantiation of the app; and notification logic executed by the processor for transmitting a message to the user, the message comprising a notification identifying the personalized instantiation of the app and enabling creation of a second personalized instantiation of the app on the user's device.

23. The computing device of claim 22, wherein the parameters to configure the app further comprise parameters selected from a group of parameter types consisting of background settings, color settings, time message is stored settings, time message is displayed settings, location sharing settings, communication settings, and display settings.

24. The computing device of claim 22, wherein the app comprises an app chosen from a group of apps consisting of: a messaging app, an email app, a social networking app, a weather app, a photo app, or a currency converter app.

25. The computing device of claim 22, further comprising icon generating logic executed by the processor for generating a personalized icon for display, the personalized icon related to the personalized instantiation of the app.

26. The computing device of claim 22, further comprising advertisement displaying logic executed by the processor for displaying an advertisement related to displayed contents of the personalized instantiation of the app.

27. A non-transitory computer readable storage medium having computer readable program instructions in the medium for causing a processor to:

generate, by the processor, an app comprising a home screen, the app for downloading to a computing device and for enabling creation of a personalized instantiation of the app by generating a deep linked shortcut on the home screen of the app that links into the app with parameters to configure a plurality of user interface elements of the app into the personalized instantiation of the app, wherein the deep linked shortcut comprises a scheme, an identifier representing the app, and the parameters, and the parameters modifying an operation performed by the app;

provide, by the processor, the app for access by the computing device so that the personalized instantiation of the app can be launched as configured with the parameters; and transmit, by the processor, a message to a user, the message comprising a notification identifying the personalized instantiation of the app and enabling creation of a second personalized instantiation of the app on the user's device.

* * * * *